Patented Feb. 28, 1933

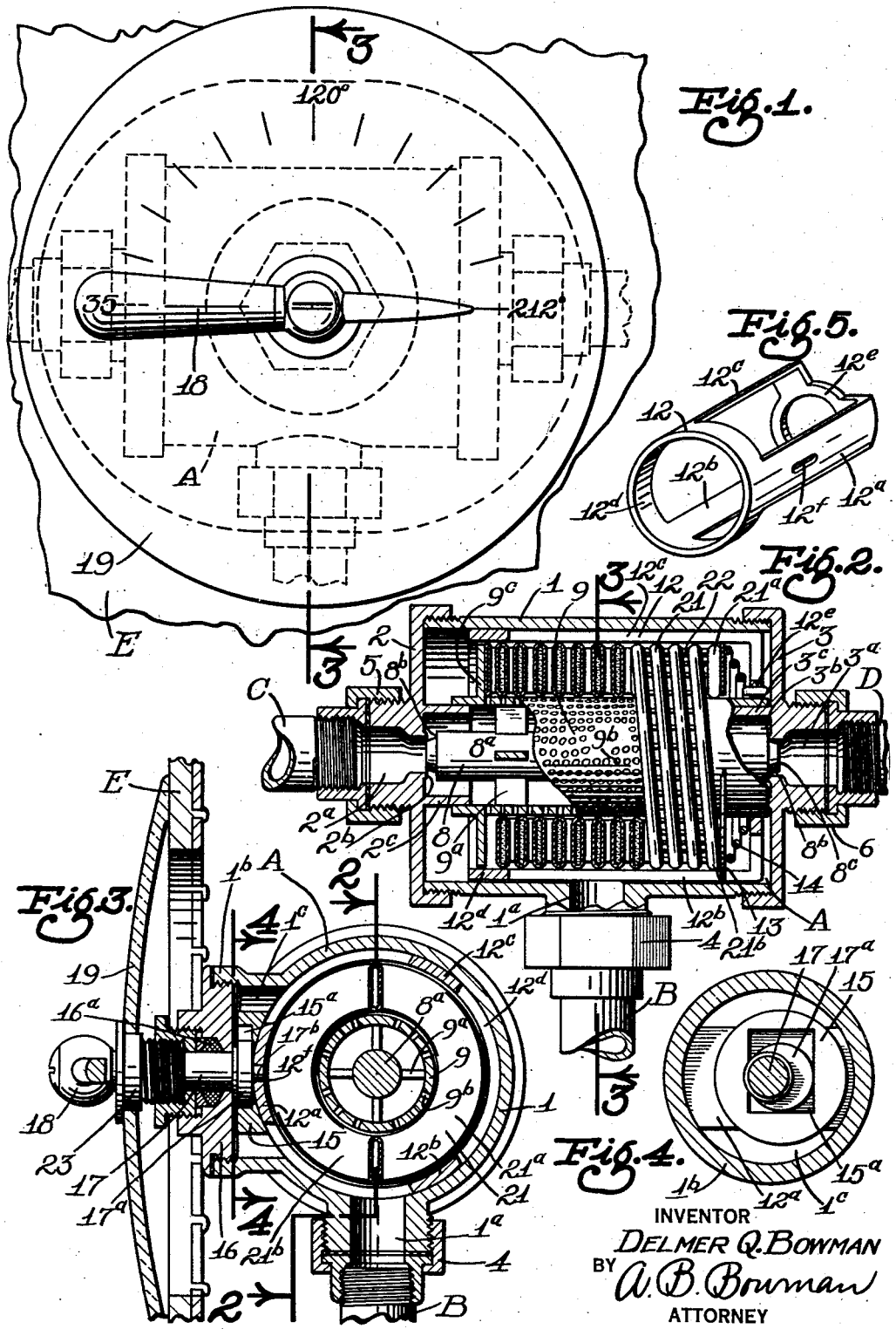

1,899,494

UNITED STATES PATENT OFFICE

DELMER Q. BOWMAN, OF NEWHALL, CALIFORNIA

THERMOSTATIC CONTROLLED MIXING HEAD

Application filed April 20, 1931. Serial No. 531,385.

My invention relates to thermostatic controlled mixing heads for use in connection with shower baths and bath tubs, and in such other places where a uniform temperature of water is desired.

The objects of my invention are: First, to provide a device of this class for controlling to within small limits the temperature of resulting mixed hot and cold water or other fluids, second, to provide a device of this class whereby the temperature of the water or other fluid may be readily varied by means of a single handle or other manual means; third, to provide a device of this class whereby the water is thoroughly mixed before being discharged; fourth, to provide a novel valve means for opening either the hot or cold water or other fluid inlet and simultaneously closing the other, thereby controlling the temperature of the discharged water or other fluid; fifth, to provide a novel thermostat for effecting the movements of the valve, and one that is sensitive to small changes of temperature; sixth, to provide novel means for causing the water to pass over, through, or impinge against the thermostat; seventh, to provide as a whole a novel adjustable thermostatic means for varying the temperature of the discharged water or other fluid; eighth, to provide novel safety means against the breaking of the thermostat and for taking up over expansion of the thermostat; ninth, to provide a device of this class that is small and compact; tenth, to provide a device of this class that may be easily and readily removed and placed in a wall or partition; and, eleventh, to provide a device of this class that is simple and economical of construction, durable, and one which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawing and to the characters of reference thereon which form a part of this application in which:

Figure 1 is a front elevational view showing the mixing head mounted within a wall; Fig. 2 is a longitudinal sectional elevational view of the mixing head taken at 2—2 of Fig. 3, showing certain parts in elevation to facilitate the illustration; Fig. 3 is a transverse sectional elevational view thereof, taken at 3—3 of Figs. 1 and 2; Fig. 4 is a sectional view taken at 4—4 of Fig. 3; and, Fig. 5 is an isometric view on a reduced scale of the thermostat cage.

Like characters of reference refer to similar parts and portions throughout the views of the drawing.

The mixing head comprises a casing A provided with water inlets and outlets, and in which is contained the thermostat and the valves controlled thereby. The casing consists of a central cylindrical member 1 and end cover members 2 and 3, screwed or otherwise secured to the member 1. The cylindrical member 1 is provided intermediate its ends with an outlet 1a to which is connected a discharge pipe B by means of a union connection 4. The cylindrical member 1 is also provided intermediate its ends with a radially extending boss 1b having an opening 1c therein, the axis of the boss being positioned at substantially right angles to the outlet 1a. The covers 2 and 3 are provided at their centers with hot and cold water inlets 2a and 3a respectively, which are connected to hot and cold water pipes C and D by means of union connections 5 and 6, respectively. Extending around the inlets 2a and 3a on the inside of the covers and concentric with the inlets are annular shoulders 2b and 3b which form valve seats which are engageable by the valve 8 to be hereinafter described. Each of the covers is provided also with a valve support and guide, designated 2c and 3c respectively, in the form of an inwardly extending sleeve positioned concentric with the inlets 2a and 3a, respectively.

It will be here noted that the cylindrical member 1 may be provided with additional outlet connections, if desired, as when the mixing head is used in combination with a shower and a bath tub. It will also be noted that all of the connections to the casing A are made by union connections, thus making the placing and removing of the casing a simple operation. It will be further noted that the covers 2 and 3 are identical in construction thereby making them interchangeable and reducing the total number of parts.

The valve member 8 is in the form of a cylindrical rod 8a having an outside diameter slightly greater than the diameter of the seats 2b and 3b and of a length shorter than the distance between the seats 2b and 3b. The ends of the rod 8a are ground flat to form shoulder portions 8b which are adapted to engage the seats 2b and 3b for forming valves which close the inlets 2a and 3a. The ends of the rod 8a are also provided with conical projections 8c which are adapted to extend into the inlets 2a and 3a thereby producing gradual increase or decrease in the flow of water as the valve is moved away from or toward either of the seats 2b or 3b. The valve member 8 is adapted to be shifted longitudinally of the casing by a thermostat 21, to be hereinafter described. When the valve is so shifted one inlet is opened while the other is simultaneously and proportionately closed. The valve member 8 is carried by and supported within the casing by a tubular member 9 carried by and longitudinally slidably positioned over the sleeves 2c and 3c. The valve member 8 is connected to the tubular member 9 by means of a number of radial supports 9a positioned at the opposite ends of the valve member. The radial supports 9a are spaced inwardly from the ends to permit the shoulders 8b to engage the seats 2b and 3b. Water entering the casing through the inlets 2a and 3a first enters the tubular member 9, in which the hot and cold water becomes mixed, and then passes into the casing A through a multiplicity of holes 9b in the tubular member 9. By causing the water to enter the casing A through the tubular member 9 and the holes 9b the water is forced to pass over, through and against the thermostat 21. The tubular member 9 is provided at one end with a flange 9c to which one end of the thermostat is secured for affecting the movement of the valve 8. Positioned around, concentric with, and spaced from the tubular member 9 is a cage 12 carried by the casing A adapted to be moved longitudinally of the casing A. The cage 12 is of an open or foraminous construction consisting of three longitudinally extending arms 12a, 12b and 12c jointed at one end by a cylindrical sleeve 12d, adapted to extend around the flange 9c, and joined at the opposite end by a small ring 12e adapted to slide over the tubular member 9 at the opposite end thereof. Longitudinally slidably mounted within the cage 12 near the ring 12e is a circular plate or disc 13 spaced from the ring 12e by a conical coil spring 14 and secured to the opposite end of the thermostat. The spring 14 is preferably so shaped that the convolutions thereof enter each other when the spring is compressed. The opposite ends of the spring are secured to the disc 13 and the ring 12e. The disc 13 is spaced from the ring 12e, when the spring 14 is undistorted, preferably by an amount equal to the maximum longitudinal movement of the valve member 8 plus the diameter of the wire from which the spring itself is formed. The strength of the spring 14 is such that the valve member 8 will be moved by the thermostat, until the valve member 8 engages the seat 2b before compressing the spring 14. Secured to the arm 12a of the cage 12 is a shoe 15, which is provided with a transversely extending slot 15a, and is adapted to extend into the opening 1c in the boss 1b. The diameter of the shoe 15 is less than the diameter of the opening 1c in the boss 1b by an amount at least equal to the maximum longitudinal movement of the cage 12. The opening 1c is provided with a cover or plug 16 through which extends a shaft 17. The shaft 17 is provided at its inner end with an eccentric 17a fitting into the rectangular slot 15a of the shoe 15 for affecting the longitudinal movement of the cage 12. The slot 15a is of a width equal to the diameter of the eccentric and in length is equal to the diameter of the eccentric plus the length of the throw, thus preventing the eccentric from being turned or rotated more than 180°, it being noted that the slot extends a greater distance to one side of the horizontal median line than to the other side so that the cage may be moved longitudinally of the casing A a distance equal to twice the throw of the eccentric. The extent of the longitudinal movement of the cage is equal substantially to the axial expansion of the thermostat, which expansion in turn is substantially equal to twice the longitudinal movement of the valve member 8, as will be more specifically described hereafter. The cage 12 is prevented from rotating within the casing A by means of a pin 17b carried by and coaxial with the shaft 17 and positioned inwardly from the cam or eccentric 17a, the pin extending into a longitudinal slot 12f in the arm 12a of the cage 12, as shown in Figs. 3 and 5. The shaft 17 is carried by and extends coaxially through the plug 16 and through a packing nut 16a at the outer side of the plug. The outer end of the shaft 17 is provided with a handle and index finger 18. The finger is adapted to point to the desired temperature of the discharged water, the temperature markings or indicia being indicated upon a cover 19 which is held in place against the wall E of the building by means of a shoulder sleeve 23, as shown in Fig. 3. Since the temperature of the discharged water depends upon the position of the cage 12 within the casing, as will be more fully hereinafter described, and since the handle 18 in combination with the eccentric 17a moves the cage 12 longitudinally of the casing A, the temperature of the water will be thus changed by the movement of the handle 18.

The thermostat 21 comprises preferably two helical coils formed of flattened tubes, of a spring material capable of conducting heat readily, and in which the convolutions of the separate coils are interpositioned with each other, the convolutions being uniformly spaced apart and the ends of the coils being secured to the flange 9c and the plate 13 for holding the convolutions in such spaced relation. The adjacent convolutions of the coils are spaced apart by means of spacers 22 which are preferably of foraminous construction to permit the water to pass radially outwardly between the convolutions of the coils of the thermostat from the tubular member 9 through the holes 9b. The coils of the thermostat are filled with a rapidly expanding liquid having a substantially uniform coefficient of expansion, such as alcohol. It will be here noted that although two independent coils are used in this instance, one, or more than two coils may be used as desired. In operation, hot water passing between the convolutions of the coils, heats the liquid therein, expanding the same, and forces the flattened sides of the tubes apart or outwardly, which causes an increase in the over all length of the thermostat, therefore tending to shift the valve member 8 toward the hot water inlet 2a and away from the cold water inlet 3a, thereby increasing the flow of the cold water and decreasing the flow of the hot water. In view of the manner in which the thermostat operates the valve, it is easily seen that the temperature of the discharged water may be varied by shifting the cage 12 longitudinally of the casing A by means of the handle 18 and the eccentric 17a.

A very important feature in connection with the thermostat 21 is the safety means for taking care of any excessive or unlooked for expansion of the thermostat in case the cage 12 is shifted so the valve member 8 normally closes the hot water inlet 2a, that is, when cold water only is desired. If hot water should accidentally enter the mixing head through the cold water inlet 3a, when the cage 12 is shifted, the expansion of the thermostat is taken up by compressing the conical coil spring 14 by the movement of the plate 13, thereby permitting the thermostat to expand and preventing breaking of the thermostat.

The operation of the mixing head is as follows:

Assuming first that the handle 18 is in the position shown in Fig. 1, which places the cage and valve in the position shown in Fig. 2, the valve member 8 is forced against the seat 3b thereby closing the cold water inlet so that all of the water entering the casing will be hot water. The valve member is forced against the seat 3b under tension of the spring 14. Under this condition the thermostat is permitted to expand its full distance without unseating the valve member from the cold water inlet seat 3b. As the thermostat becomes heated, the force with which the valve 8 is held against the seat 3b will decrease, due to the expansion of the thermostat, as the temperature of the water aproaches the temperature indicated by the handle and pointer 18. When the indicated temperature is less than the highest temperature of the head, the valve will open the inlet 3a and permit cold water to enter in sufficient proportion to maintain the discharged water of the desired temperature set by the handle 18. As the handle 18 is rotated counterclockwise the force with which the valve member 8 is held against the shoulder 3b is decreased. Thus less expansion of the thermostat is required to open the cold water inlet than is required when water of higher temperature is desired, the opening of the cold water inlet under such conditions maintaining the temperature of the water at the point indicated by the index pointer. The operation of the device is substantially the same throughout the whole of the temperature range covered by the mixing head.

It will be here noted that although I have herein referred primarily to mixing heads for hot and cold water, the term water includes any other liquid or fluid which may be mixed and controlled.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a device of the class described, a casing having hot and cold water inlets and a discharge outlet, valve means for controlling the flow of water through said inlets, a thermostat operatively connected to said valve means, and a mixing tube, said inlets being positioned at the opposite ends and connected by said tube, said tube having means for causing water mixed therein to impinge against the thermostat.

2. In a device of the class described, a casing having hot and cold water inlets and a discharge outlet, a unitary valve member for controlling the flow of water through said inlets, a thermostat operatively connected to said valve member, a mixing tube connecting said inlets and having means for causing the water mixed therein to impinge against the thermostat, manual means for shifting said thermostat longitudinally of said casing, and resilient means connecting said manual means with said thermostat.

3. In a device of the class described, a casing having hot and cold water inlets at the opposite ends thereof and a discharge outlet provided thereon, a valve member adapted to control the flow of water through said inlets, a tubular member positioned around the valve member and slidably supported at the opposite ends of the casing, and a thermostat for shifting said valve member longitudinally of said casing.

4. In a device of the class described, a casing having hot and cold water inlets at the opposite ends thereof and a discharge outlet positioned thereon, a unitary valve member adapted to control the flow of water through said inlets by longitudinal movement of said valve, a tubular mixing member positioned around and secured to the valve member and slidably supported at the ends of the casing concentric with said inlets, and a thermostat for shifting said valve member and said mixing member between said inlets.

5. In a device of the class described, a casing provided with hot and cold water inlets at the opposite ends of the casing and having an annular seat extending around each inlet and provided with a discharge outlet, a valve member comprising a cylindrical rod having valve portions at its opposite ends for engaging the seats and closing said inlets, a tubular mixing member slidably supported at the ends of the casing concentric with said inlets, said valve member being carried by said mixing member, and a liquid thermostat for shifting said valve member and said mixing member between said inlets.

6. In a device of the class described, a casing provided with hot and cold water inlets at the opposite ends thereof and a discharge outlet therein, each of said inlets having an annular seat extending therearound, a valve member comprising a cylindrical rod having shoulders and conical projections at its opposite ends, said conical projections being adapted to extend into said inlets, and said shoulders being adapted to engage said seats, a tubular mixing member slidably supported at the ends of the casing concentric with said inlets, said valve member being carried by said mixing member, said mixing member being provided with a multiplicity of discharge ports, and a thermostat for shifting said valve member and said mixing member longitudinally of said casing between said inlets, and manual means for shifting said thermostat longitudinally of said casing.

7. In a device of the class described, a casing having hot and cold water inlets at the opposite ends thereof and a discharge outlet therein, a valve member adapted to control the flow of water through said inlets, a tubular mixing member longitudinally slidably supported at said opposite ends of said casing, said valve member being carried by said mixing member, a thermostat for shifting said valve member longitudinally of said casing, and means for taking up expansion of the thermostat when the movement at said valve is restricted.

8. In a device of the class described, a casing having hot and cold water inlets at its opposite ends and a discharge outlet therein, a unitary valve member adapted to move between said inlets, a tubular mixing chamber member longitudinally slidably supported by the opposite ends of said casing and carrying said valve, said mixing chamber member being provided with a multiplicity of outlets, a cage slidable longitudinally of said casing, a thermostat operatively connecting said cage with said mixing chamber member and adapted to move said valve longitudinally of said casing between said inlets, and manual means for shifting said cage longitudinally of said casing.

9. In a device of the class described, a casing having hot and cold water inlets and a discharge outlet, valve means for controlling said inlets, and a thermostat for operating the valve means, said thermostat comprising helical coil means of flat tubing and foraminous spacer means separating the adjacent convolutions thereof.

10. In a device of the class described, a casing having hot and cold water inlets and a discharge outlet, valve means for controlling said inlets, and a thermostat for operating the valve means, said thermostat comprising helical coil means of flat tubing and foraminous spacer means separating the adjacent convolutions thereof, said tubing being filled with rapidly expanding liquid.

11. In a device of the class described, a casing having opposed hot and cold water inlets and a discharge outlet, a unitary valve member adapted to move between said inlets, a tubular mixing chamber member longitudinally slidably supported by said casing adjacent said inlets and carrying said valve member, said mixing chamber member being provided with a multiplicity of outlets, a cage longitudinally slidable within said casing, a thermostat comprising a helical coil positioned circumferentially around said mixing chamber member, said coil being filled with a rapidly expanding liquid, said thermostat being operatively connected at one end to said mixing chamber member and at its opposite end to said cage, and manual means for shifting said cage between the inlets of said casing.

12. In a device of the class described, a casing having opposed hot and cold water inlets and a discharge outlet, a unitary valve member adapted to move between said inlets, a tubular mixing chamber member longitudinally slidably supported by said casing adjacent said inlets and carrying said valve member, said mixing chamber member being provided with a multiplicity of outlets, a cage longitudinally slidable within said casing, a thermostat comprising a helical coil positioned circumferentially around said mixing chamber member and within said cage, said thermostat being operatively connected to one end to said mixing chamber member and at its opposite end to said cage, and handle and eccentric means adapted for manually shifting said cage longitudinally of said casing.

13. In a device of the class described, a casing having opposed hot and cold water inlets and a discharge outlet, a unitary valve member adapted to move between said inlets, a tubular mixing chamber member longitudinally slidably supported by said casing adjacent said inlets and carrying said valve member, said mixing chamber member being provided with a multiplicity of outlets, a cage longitudinally slidable within said casing, a disc axially slidably supported by said cage, spring means operatively connecting said disc with one end of said cage, a thermostat comprising a helical coil positioned circumferentially around said mixing chamber member and within said cage, said thermostat being operatively connected at one end to said mixing chamber member and at the opposite end to said disc, and means for shifting said cage and thermostat longitudinally of said casing.

14. In a device of the class described, a casing having hot and cold water inlets and a discharge outlet, a valve member adapted to control the flow of water through said inlets, a tubular mixing chamber member longitudinally slidably supported by the casing adjacent the inlets and operatively connected with said valve, a cage slidable within said casing, a thermostat operatively connecting the tubular mixing chamber member and the cage for shifting said valve member with respect to the inlets, means for taking up expansion of the thermostat when the movement of said valve is restricted, said means comprising spring means operatively connecting one end of said thermostat to said cage.

15. In a device of the class described, a casing having hot and cold water inlets and a discharge outlet, valve means for controlling said inlets, a thermostat for operating the valve means, said thermostat comprising helical coil means of flat tubing and foraminous spacer means separating the adjacent convolutions thereof, manual means for adjusting the thermostat, and resilient take up means connecting the latter means to one end of the thermostat.

16. In a device of the class described, a casing having hot and cold water inlets and a discharge outlet, means in association with the inlets for closing either of the inlets or opening one while proportionately closing the other, a single thermostat connected with the valve means for operating and closing the inlets depending upon the temperature of water issuing from said outlet, means for shifting and adjusting the valve means through the thermostat, and resilient means connecting the latter means to the thermostat.

17. In a device of the class described, a casing having hot and cold water inlets and a discharge outlet, valve means for controlling the flow of water through said inlets, a thermostat operatively connected to said valve means and a mixing tube positioned within said thermostat and connecting said inlets and having means for causing water mixed therein to impinge against the thermostat.

In testimony whereof, I have hereunto set my hand at Newhall, California this 11th day of April, 1931.

DELMER Q. BOWMAN.